(No Model.) 2 Sheets—Sheet 1.

MARQUIS DE FRAYSSEIN BONNIN.
OPTICAL SIGHT.

No. 538,230. Patented Apr. 30, 1895.

(No Model.) 2 Sheets—Sheet 2.

MARQUIS DE FRAYSSEIN BONNIN.
OPTICAL SIGHT.

No. 538,230. Patented Apr. 30, 1895.

Witnesses:
Celeste R. Chapin
Jean Elliott

Inventor:
Marquis de Frayssein Bonnin
By Francis W. Parker,
Attorney.

THE NORRIS PETERS CO., PHOTO-LITHO., WASHINGTON, D. C.

UNITED STATES PATENT OFFICE.

MARQUIS DE FRAYSSEIN BONNIN, OF TOULON, FRANCE.

OPTICAL SIGHT.

SPECIFICATION forming part of Letters Patent No. 538,230, dated April 30, 1895.

Application filed July 13, 1891. Serial No. 399,429. (No model.) Patented in France July 19, 1890, No. 207,026.

*To all whom it may concern:*

Be it known that I, MARQUIS DE FRAYSSEIN BONNIN, a citizen of France, residing at Toulon, France, have invented certain new and useful Improvements in Optical Sights, (for which I have obtained a patent in France, No. 207,026, bearing date July 19, 1890,) of which the following is a specification.

My invention relates to optical sights, such as are designed to be used in connection with cannons or guns or any other kind of firearms. It is illustrated in the accompanying drawings, wherein—

Figure 1:
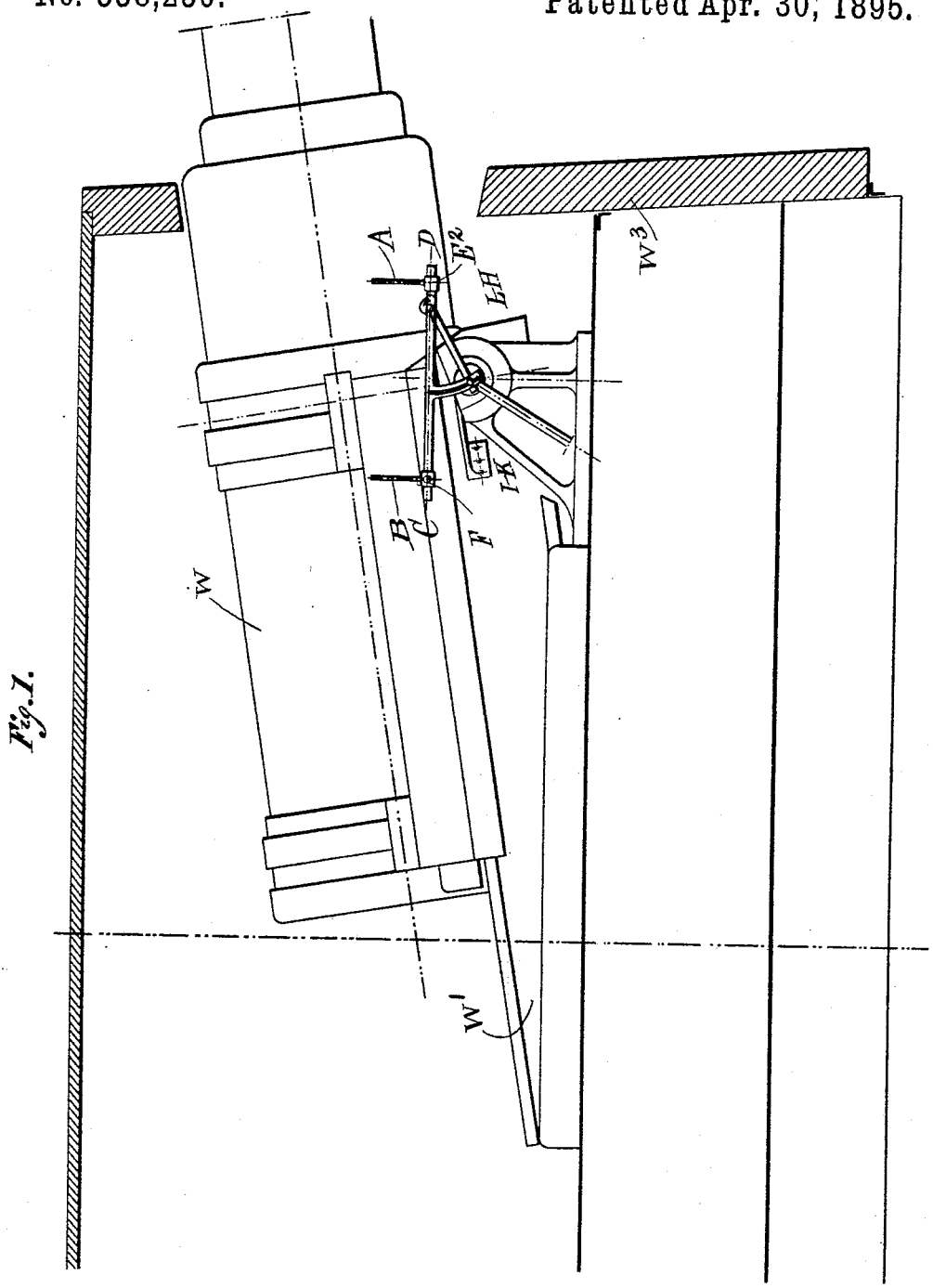
Figure 2:
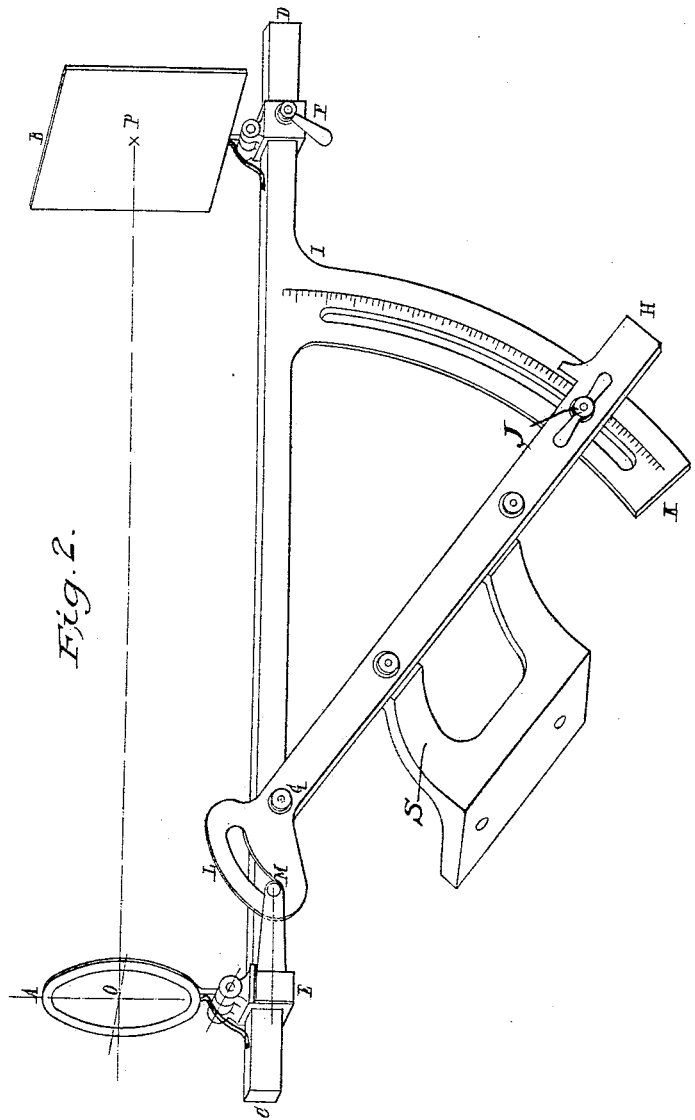

Figure 1 is a cross section through a turret or the like, in which a cannon is shown as mounted. Many of the parts are omitted for the greater clearness of those which it is desired to describe. Fig. 2 is an enlarged detail view of the sight.

Like parts are indicated by the same letters in both figures.

A is a converging lens; B, a plate placed behind the lens to receive the image of the object upon which is indicated the point P, called the point of firing. The small straight rule C, D, called the firing rule, supports the lens A and the plate B by means of the grooved sockets E F. This rule is permanently parallel to the optical axis O. P. A second straight rule L H, called the pointing rule, is pivoted upon the first rule and supported on the main carriage by a laterally projecting support S. This rule is permanently parallel to the axis of the firearm. The graduated arm I K, measures the angle between the two rules and hence the firing angle. The set screw J, is employed whereby to clamp the pointing rule and the graduated arm together in a fixed position at a given angle. At the other end of the pointing rule is the arc shaped slot L.

M is a button on the end of the arm projecting from the socket E, and this button projects into the slot L. The pointing rule is pivoted to the firing rule at G and by means of a set screw the socket F may be secured to any point along the firing rule.

W is a gun having the slide ways W' W' upon which it moves, the whole being mounted upon the pivot $W^2$ and inclosed within the turret or back of the protecting plate $W^3$ in any desired manner.

This instrument may be applied to any gun at any point and attached thereto directly or indirectly or upon any part associated with the gun which partakes of the movement of the gun. The protection in front of the gun is pierced by the small hole T independent of the opening of the port hole for the firearm and opposite the sight.

It will be readily seen that the device as here shown is capable of great modifications without departing from the spirit of my invention and I do not wish to be limited to the construction, detail or relations indicated. I make the lens and plate of different sizes and shapes, and the sockets I so construct that by removing the connecting pin, the plates and lenses may be removed and others substituted at will. The images received upon the plate may be received at any other point or position according as occasion requires, in many ways well known to those familiar with such instruments. The plate may be transparent or opaque so that the image may be observed from behind or in front of the sight.

To protect the instrument I use the usual springs and cushions which are not here shown and which are often unnecessary.

I have shown the device so constructed that varying the angle between the firing and pointing rules moves the lens, but of course the plate itself could be moved, and portions of the instrument in that event would be turned around to a new position.

The scale on the graduated arm will vary, of course, according to the relation of the other parts and it need not be in the precise relation shown. The important point, of course, is the relation of the angle of the two rules to the distance between the plate and lens. Any change in form of the graduated arm would of course necessitate a change of form of the cam and pointing rule and firing rule or the lens and plate.

The use and operation of my invention are as follows: When the distance of the object is known or estimated the operator will move the pointing arm or rule along the graduated arm until it reaches the point on the scale corresponding to such distance. The gun is then brought to a point where the image projected by the lens is projected upon the plate at the firing point, whereupon it will be found that the gun is at the right elevation or inclination and properly directed toward the object.

One of the most important results of the employment of the optical sight, is the possibility of completely closing the artillery opening, especially on board of vessels. Marine towers containing cannons of large caliber, can in like manner, by use of the optical sight, be completely and almost hermetically closed, while at the same time permitting the operator to obtain a greater precision in firing. It is also possible to close, by the employment of this device, the port holes of batteries, or to reduce them to dimensions absolutely necessary for the discharge or for the muzzle of the cannon, or to cover them by masks, retaining sufficient width of the port hole or the like, to permit the pointing of the gun in any direction or altitude. Fire arms already provided with masks or protections for the gunners could also easily receive the optical sight.

I claim—

An optical sight comprising a lens with an image plate behind the same to receive the image of the object at which the gun is directed, a firing rule upon which the lens and plate are supported, a pointing rule pivoted to said firing rule, a graduated arm along which said pointing rule is moved to give the muzzle of the gun different elevations corresponding to different distances of the object to be fired at, and a cam on said pointing rule by which the lens is moved so as to regulate its focal distance.

In testimony whereof I have signed this specification in the presence of two subscribing witnesses.

MARQUIS DE FRAYSSEIN BONNIN.

Witnesses:
   M. LINES,
*Végociant*, 48 *auc Nationale, Toulon.*
   L. J. B. V. JOUVE,
*U. S. Consular Agent at Toulon.*

It is hereby certified that the name of the patentee in Letters Patent No. 538,230, granted April 30, 1895, for an improvement in "Optical Sights," was erroneously written and printed "Marquis de Frayssein Bonnin," whereas said name should have been written and printed *Marquis de Fraysseix Bonnin;* and that the said Letters Patent should be read with this correction therein that the same may conform to the record of the case in the Patent Office.

Signed, countersigned, and sealed this 25th day of June, A. D. 1895.

[SEAL.]
JNO. M. REYNOLDS,
*Assistant Secretary of the Interior.*

Countersigned:
JOHN S. SEYMOUR,
*Commissioner of Patents.*